(12) United States Patent
Tazaki et al.

(10) Patent No.: US 7,527,836 B2
(45) Date of Patent: May 5, 2009

(54) OPTICAL ELEMENT AND METHOD FOR MANUFACTURING THE SAME

(75) Inventors: Keiko Tazaki, Tokyo (JP); Runa Nakamura, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 325 days.

(21) Appl. No.: 11/315,474

(22) Filed: Dec. 22, 2005

(65) Prior Publication Data

US 2006/0141171 A1 Jun. 29, 2006

(30) Foreign Application Priority Data

Dec. 28, 2004 (JP) .............................. 2004-381123

(51) Int. Cl.
C09K 19/56 (2006.01)
(52) U.S. Cl. ........................... 428/1.2; 428/1.1; 349/123
(58) Field of Classification Search ......... 349/123–124, 349/127, 135; 428/1.1–1.2
See application file for complete search history.

(56) References Cited

U.S. PATENT DOCUMENTS 5,965,761 A * 10/1999 Buchecker et al. .......... 556/440
5,998,101 A * 12/1999 Park et al. .................... 430/321
6,582,776 B2 * 6/2003 Yip et al. ..................... 427/514
2001/0030727 A1 * 10/2001 Schadt et al. ................ 349/124
2002/0098295 A1 * 7/2002 Yip et al. ..................... 427/487
2002/0167627 A1 * 11/2002 Umeya ......................... 349/96
2002/0180916 A1 * 12/2002 Schadt et al. ................ 349/117
2003/0099785 A1 * 5/2003 O'Neill et al. ............. 428/1.26
2004/0252259 A1 * 12/2004 Schadt et al. ................. 349/98

FOREIGN PATENT DOCUMENTS

| JP | 5215921 | 8/1993 |
| JP | 8338913 | 12/1996 |
| JP | 9152509 | 6/1997 |
| JP | 10010320 | 1/1998 |
| JP | 2000514202 | 10/2000 |
| JP | 2002-533742 A | 10/2002 |

* cited by examiner

*Primary Examiner*—Keith D Hendricks
*Assistant Examiner*—Sophie Hon
(74) *Attorney, Agent, or Firm*—Ladas & Parry LLP

(57) ABSTRACT

The present invention provides an optical element capable of improving the adhesion between the alignment property providing layer, for providing the alignment property to the refractive index anisotropic layer, and the refractive index anisotropic layer, as well as improving durability of each layer.

4 Claims, 3 Drawing Sheets

OPTICAL ELEMENT AND METHOD FOR MANUFACTURING THE SAME

BACKGROUND OF THE INVENTION

1. Field of the Invention

The present invention relates to an optical element such as a retardation plate, a polarizing plate, and a color filter for a display. In particular, the invention relates to an optical element comprising a liquid crystal Layer, made from a liquid crystalline composition including a polymerizable liquid crystal material, as a refractive index anisotropic layer, and a method for manufacturing the same. In this specification, the term "liquid crystal layer" is used for the meaning of a layer optically having the property of a liquid crystal, and those having a solid phase state solidified while maintaining the molecular arrangement of the liquid crystal phase are also included as the layer state.

2. Description of the Related Art

In general, the liquid crystal is used as a display medium such as a display element, represented by the TN (twisted nematic) type and the STN (super twisted nematic) type, utilizing the reversible motility of the molecular arrangement. Also, the liquid crystal is used as an optical element such as a retardation plate, a polarizing plate and a color filter for a display, utilizing the alignment property and the refractive index anisotropy.

Here, as to the applications of the latter, recently, a large number of optical elements comprising a liquid crystal layer made from a polymerizable liquid crystal material, as a refractive index anisotropic layer, have been proposed. Specifically, for example, Japanese Patent Application National Publication (Laid-Open) No. 2002-533742 discloses an optical element having the function of the wavelength selective reflecting property and the polarization selective reflecting property, which is produced by using a special polymerizable liquid crystal compound. Moreover, Japanese Patent Application Laid Open (JP-A) No. 5-215921 discloses a birefringence plate produced by using a polymerizable liquid crystal compound having a rod like structure. Furthermore, JP-A Nos. 8-338913 and 9-152509 disclose an optical compensating sheet produced by using a polymerizable liquid crystal compound having a disc like structure.

A generally used optical element has a supporting member, such as a plastic film, and a liquid crystal layer (refractive index anisotropic layer) made from a polymerizable liquid crystal material laminated on the supporting member via an alignment film.

Here, the alignment film provided in between the supporting member and the refractive index anisotropic layer has the alignment limiting force of limiting the alignment direction of the liquid crystal molecules in the refractive index anisotropic layer. Such an alignment film can be formed by, for example, forming a polymer layer of a polyimide, a polyvinyl alcohol, gelatin, etc., having the alignment property, on the supporting member, and subjecting the alignment treatment, such as a rubbing treatment, to the polymer layer. In the case the rubbing treatment is subjected as the alignment treatment, since the static electricity or the dusts are generated on the surface of the alignment film, a technique, for making the alignment film to exhibit the alignment limiting force without subjecting the rubbing treatment, is studied. The photo-alignment method is one of them, in which the alignment limiting force (anisotropy) is generated on the surface of the alignment film by irradiating light having an optional polarization state (polarized light). Such photo-alignment method includes: the "photo anisotropic type" of reversibly changing the alignment state by changing only the molecule shape; and the "photo reaction type" of changing the molecules themselves. The latter "photo reaction type" can further be classified into the dimerization type, the decomposition type, the coupling type, the decomposition-coupling type, or the like.

In the optical elements comprising the supporting member, the alignment film and the refractive index anisotropic layer as explained above, it is of course important that the optical characteristics of each layer of the optical element are preferable. However, it is also important that the adhesion between the layers and the durability of each layer are preferable. As to the latter problem, for example, if the adhesion between the alignment film and the refractive index anisotropic layer constituting the optical element is poor, there is a problem that the refractive index anisotropic layer can be easily peeled off from the alignment film. Moreover, if the optical element is used or stored in a high temperature and high humidity environment, there is a problem that mesh like wrinkles are generated in the refractive index anisotropic layer.

In order to solve such problems, conventionally, the following techniques have been proposed.

That is, JP-A No. 9-152509 proposes a method in which a modified polyvinyl alcohol is used, as the alignment film material, to improve the adhesion between the layers due to chemical coupling at the interface of the alignment film and the refractive index anisotropic layer. Moreover, JP-A No. 10-10320 proposed a method in which the adhesion between these layers is improved by inserting an anchor coating layer in between layers of a low adhesion. Furthermore, Japanese Patent Application National Publication (Laid-Open) No. 2000-514202 proposes a method in which the durability of the refractive index anisotropic layer is improved by adding a monomer into the material of the refractive index anisotropic layer. Specifically, it proposes a method in which the glass transition temperature, the thermal stability and the mechanical stability is changed by containing a non-mesogen compound having two or three or more polymerizable functional groups by amount of 20% or less with respect to a reactive mesogen compound, as the refractive index anisotropic layer material.

However, among the conventional methods mentioned above, in the method mentioned in JP-A No. 9-152509, since the boiling point of the solvent, used for the modification reaction of the polyvinyl alcohol, is high, the coating solution including such solvent cannot be utilized. Therefore, a refining process of reprecipitation of the polyvinyl alcohol is indispensable, and thus, there is a problem that the manufacturing cost is increased. Moreover, in the method disclosed in JP-A No. 10-10320, when the liquid crystal compound is used as the material for the refractive index anisotropic layer, there is a problem that the liquid crystal molecules are not aligned preferably on the anchor coating layer. Furthermore, in the method mentioned in Japanese Patent Application National Publication (Laid-Open) No. 2000-514202, in the case of providing the refractive index anisotropic layer by fixing the alignment state of the liquid crystal molecules after the alignment treatment, the additives will be the impurities at the time of aligning the liquid crystal molecules so that the alignment of the liquid crystal molecules are inhibited. Thus, there is a problem that the optical characteristics are deteriorated (for example, the display unevenness generation).

SUMMARY OF THE INVENTION

The present invention has been achieved in view of these points. An object thereof is to provide an optical element using a liquid crystal layer, made from a liquid crystalline composition including a polymerizable liquid crystal material, as the refractive index anisotropic layer, capable of improving the adhesion between the alignment property providing layer, for providing the alignment property to the refractive index anisotropic layer, and the refractive index anisotropic layer as well as improving durability of each layer, and a method for manufacturing the same.

As the first means for solving the problems, the present invention provides an optical element comprising: a transparent base material; an alignment property providing layer laminated on the transparent base material; and a refractive index anisotropic layer, laminated on the alignment property providing layer, with an alignment property provided by an alignment limiting force of the alignment property providing layer, wherein the alignment property providing layer comprises an alignment film made from an alignment film composition capable of exhibiting the alignment limiting force by an photo-alignment method, and the refractive index anisotropic layer comprises a liquid crystal layer formed by curing a liquid crystalline composition including a polymerizable liquid crystal material, and a curing degree of the refractive index anisotropic layer changes monotonously with a predetermined gradient in its thickness direction such that, within the refractive index anisotropic layer, the curing degree of a portion closer to the alignment property providing layer is larger, compared with the curing degree of a portion farther from the alignment property providing layer.

In the above-described first means for solving the problems, it is preferable that the average curing degree of the refractive index anisotropic layer is 90% or higher.

Moreover, in the above-described first means for solving the problems, it is preferable that the liquid crystalline composition for forming the refractive index anisotropic layer includes a nematic liquid crystal compound as the polymerizable liquid crystal material.

Furthermore, in the above-described first means for solving the problems, it is preferable that the alignment film composition for forming the alignment property providing layer includes a polymer having a cinnamoyl group. Here, it is preferable that the alignment film composition includes a monomer or an oligomer having one or more functional groups, in addition to the polymer. Moreover, it is preferable that the monomer or oligomer is a polymerizable liquid crystal material. Furthermore, it is preferable that the polymerizable liquid crystal material in the alignment property providing layer and the polymerizable liquid crystal material in the refractive index anisotropic layer are a material of a same kind.

As second means for solving the problems, the present invention provides a method for manufacturing an optical element comprising: a step of preparing a transparent base material with an alignment film, made from a alignment film composition capable of exhibiting an alignment limiting force by a photo-alignment method, laminated thereon as an alignment property providing layer; a step of coating a liquid crystalline composition including a polymerizable liquid crystal material onto the alignment property providing layer of the transparent base material; and a step of forming a refractive index anisotropic layer, comprising a liquid crystal layer, whose curing degree changes monotonously with a predetermined gradient in its thickness direction, on the alignment property providing layer of the transparent base material by curing the liquid crystalline composition while delaying a curing rate of the liquid crystalline composition near the surface on the side not adjacent to the alignment property providing layer, compared with the curing rate near the surface on the side adjacent to the alignment property providing layer.

In the above-described second means for solving the problems, it is preferable that, in the step of forming the refractive index anisotropic layer, a radioactive ray is irradiated to the liquid crystalline composition in a state that, among the liquid crystalline composition, only the side not adjacent to the alignment property providing layer is exposed to an air atmosphere. Here, it is preferable that the radioactive ray is an ultraviolet ray, and the liquid crystalline composition includes a polymerization initiator together with the polymerizable liquid crystal material.

According to the first means for solving the problems of the present invention, the alignment property providing layer, for providing the alignment property to the refractive index anisotropic layer, comprises an alignment film made from an alignment film composition capable of exhibiting the alignment limiting force by an photo-alignment method, and also, the refractive index anisotropic layer comprises a liquid crystal layer formed by curing a liquid crystalline composition including a polymerizable liquid crystal material, and a curing degree of the refractive index anisotropic layer changes monotonously with a predetermined gradient in its thickness direction such that, within the refractive index anisotropic layer, the curing degree of a portion closer to the alignment property providing layer is larger, compared with the curing degree of a portion farther from the alignment property providing layer. Therefore, adhesion between the alignment property providing layer and the refractive index anisotropic layer is excellent. Furthermore, durability of each layer is excellent. Therefore, the problem of peeling off of the refractive index anisotropic layer can be solved effectively. Moreover, when the average curing degree of the refractive index anisotropic layer is made to be 90% or higher, the adhesion with respect to the alignment property providing layer can further be improved. Moreover, even in the case the optical element is rolled up, a problem of blocking, caused by the refractive index anisotropic layer sticking onto the rear surface of the transparent base material, can be prevented Therefore, the problem of peeling off of the refractive index anisotropic layer, rising of the haze, unevenness generation or the like deriving from the alignment failure can be solved more effectively.

According to the second means for solving the problems of the present invention, a radioactive ray is irradiated to the liquid crystalline composition formed on the alignment property providing layer of the transparent base material, with an alignment property provided, in a state that, among the liquid crystalline composition, only the side not adjacent to the alignment property providing layer is exposed to an air atmosphere. Thereby, the liquid crystalline composition is cured while delaying a curing rate of the liquid crystalline composition near a surface on the side not adjacent to the alignment property providing layer, compared with the curing rate near a surface on the side adjacent to the alignment property providing layer. Thereby, the liquid crystalline composition can be cured gradually and slowly from the portion on the alignment property providing layer side, toward the portion on the air interface side. Thus, the curing gradient is generated, such that the uncured component is increased as getting closer toward the portion on the air interface side, from the portion on the alignment property providing layer side. Therefore, in the process of forming the refractive index anisotropic layer, the polymerizable liquid crystal material in the liquid crystalline composition is cured in a state that the shrinkage during curing is restrained as much as possible. Thus, the adhesion of the liquid crystalline composition with respect to the alignment property providing layer is maintained, as well as the internal stress generated in the liquid crystalline composition is alleviated. Thereby, the finally obtained optical element has excellent adhesion between the alignment property providing layer and the refractive index anisotropic layer. Moreover, the durability of each layer will be excellent. Therefore, the problem of peeling off of the refractive index anisotropic layer, or generation of haze and unevenness deriving from the alignment failure can be solved more effectively.

DETAILED DESCRIPTION OF THE PREFERRED EMBODIMENTS

Figure 1:
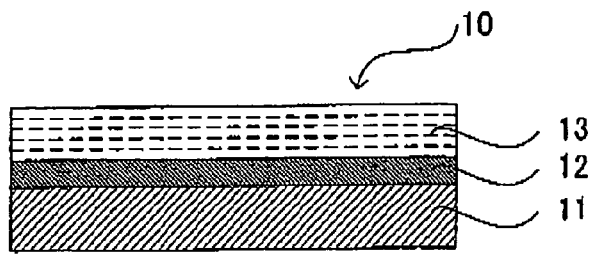
FIG. 1 is a cross-sectional view schematically showing an optical element according to an embodiment of the present invention.

Hereinafter, the embodiments of the present invention will be explained, referring to the drawings.

First, referring to FIGS. 1 and 2, the configuration of an optical element in an embodiment of the present invention will be explained.

Figure 2:
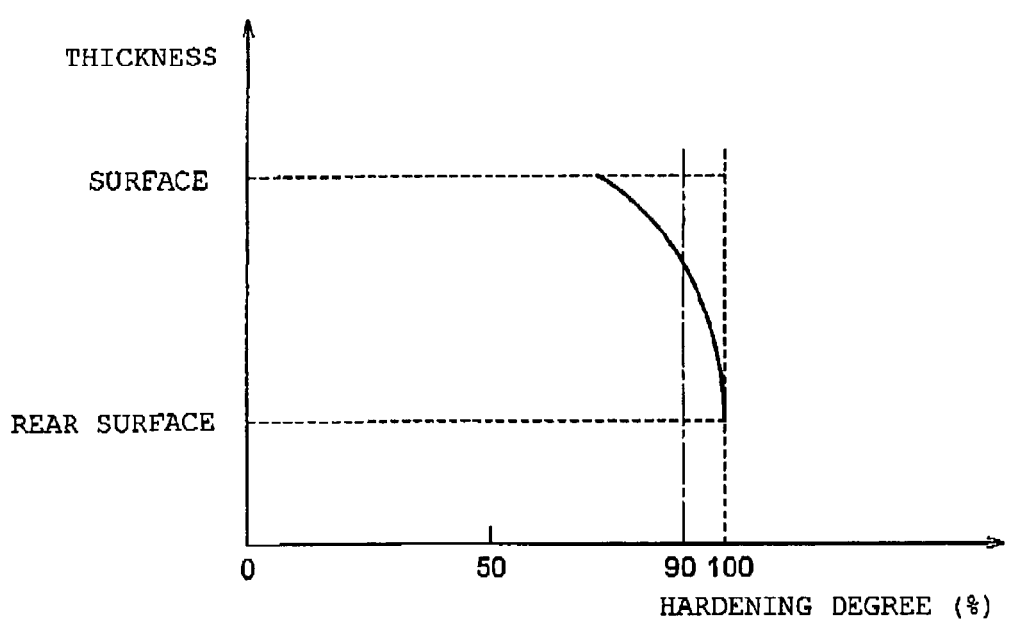
FIG. 2 is a schematic graph showing the distribution of the curing degree within a refractive index anisotropic layer of the optical element shown in FIG. 1.

As shown in FIG. 1, an optical element 10 in this embodiment comprises a transparent base material 11, an alignment property providing layer 12 laminated on the transparent base material 11, and a refractive index anisotropic layer 13 laminated on the alignment property providing layer 12.

Among them, the transparent base material 11 is a supporting member, made from a glass, a transparent resin film or the like, for supporting the alignment property providing layer 12 and the refractive index anisotropic layer 13. Here, as the transparent resin film, a film made from: the cellulose based resins such as a triacetate cellulose (TAC), a diacetyl cellulose, and an acetate butylate cellulose; the polyester based resins such as a polyethylene terephthalate (PET) and a polyester; the olefin based resins such as a polyethylene; as a polyacrylic based resins; a polyurethane based resins; resins such as a polyether sulfon, a polycarbonate, a polysulfone, a polyether, a polymethyl pentene, a polyether ketone, and a (meth)acrylonitrile can be used. As such a transparent resin film, a film made from a triacetate cellulose (TAC) having no birefringence can be used preferably.

It is preferable that the transparent base material 11 has the thickness of about 25 μm to 1,000 μm. Moreover, the transparent base material 11 may be a continuous long film having a certain length. More specifically, it may be a continuous film supplied in a rolled up state, which is commonly used industrially. The length of such a long film may be set optionally. In the case of a rolled up embodiment, for example, it may be as long as about 10,000 m.

The alignment property providing layer 12 is an alignment film having the alignment limiting force which provides the alignment property to the refractive index anisotropic layer 13. And the alignment property providing layer 12 is made from an alignment film composition capable of exhibiting the alignment limiting force by the photo-alignment method. It is preferable that the thickness of the alignment property providing layer 12 is about 0.01 μm to 0.5 μm. Here, the photo-alignment method is a method to make the surface of the alignment film to exhibit the alignment limiting force (anisotropy) by irradiating light, having an optional polarization state (polarized light), to the alignment film.

Here, as a alignment film composition for forming the alignment property providing layer 12, a polymer, a coupling agent or the like can be used. Specifically, the examples of the polymer include polymers such as a polymethyl methacrylate, an acrylic acid-methacrylic acid copolymer, a styrene-maleinimide copolymer, a polyvinyl alcohol, a modified polyvinyl alcohol, a gelatin, a styrene-vinyl toluene copolymer, a chlorosulfonated polyethylene, a nitrocellulose, a polyvinyl chloride, a polyolefin chloride, a polyester, a polyimide, a vinyl acetate-vinyl chloride copolymer, an ethylene-vinyl acetate copolymer, a carboxy methyl cellulose, a polyethylene, a polypropylene and a polycarbonate. Moreover, as the examples of the coupling agent, a silane coupling agent or the like can be presented.

As mentioned above, the photo-alignment method, which makes the alignment property providing layer 12 made from such a alignment film composition to exhibit the alignment limiting force, includes: the "photo anisotropic type" of reversibly changing the alignment state by changing only the molecule shape; and the "photo reaction type" of changing the molecules themselves. The latter "photo reaction type" can further be classified into the dimerization type, the decomposition type, the coupling type, the decomposition-coupling type or the like. Among them, as an example of the "dimerization" technique commonly used as the photo-alignment method, in the technique, chemical reaction such as the dimerization reaction is brought about in the polarization direction thereof on the surface of the alignment film by irradiating light having an optional polarization state (polarized light), so as to exhibit the alignment limiting force. As a representative of the polymer capable of exhibiting the alignment limiting force by such "dimerization", a polyvinyl cinnamate (PVCi) can be presented. In such polyvinyl cinnamate (PVCi), by the dimerization reaction, a double bond portion of two side chains, parallel to the polarized light, is opened and re-coupled with each other by irradiating for example a polarized ultraviolet ray. As other polymers capable of exhibiting the alignment limiting force by such "dimerization", a polymer having a cinnamoyl group, a coumarin group, a carchon group or the like can be used preferably (see for example JP-A Nos. 7-138380 and 10-324690).

To the above-described alignment film composition, in addition to the above-described polymers, a monomer or an oligomer having one or more functional groups may be added. As such monomer or oligomer, a monofunctional monomer having a functional group such as an acrylate based ones and a cinnamoyl based ones (such as a reactive ethyl (meth)acrylate, an ethyl hexyl(meth)acrylate, a styrene, a methyl styrene, and a N-vinyl pyrrolidone), a polyfunctional monomer (such as a polymethylol propane tri(meth)acrylate, a hexane diol(meth)acrylate, a triethylene(polypropylene)g- lycol diacrylate, a tripropylene glycol di(meth)acrylate, a diethylene glycol di(meth)acrylate, a pentaerythritol tri(meth)acrylate, a dipentaerythritol hexa(meth)acrylate, a 1,6-hexane diol di(meth)acrylate, a neopentyl glycol di(meth)acrylate, and an isocyanuric acid EO modified diacrylate), a bisphenol fluorene derivative (such as a bisphenoxy ethanol fluorene diacrylate, and a bisphenol fluorene diepoxy acrylate) or the like can be used alone or as a mixture. Since the structure of the alignment property providing layer 12, made from the alignment film composition, will be a firm mesh structure by adding such a monomer or oligomer to the alignment film composition, the strength of the alignment property providing layer 12 itself can be improved. Moreover, since the monomer or oligomer in the alignment property providing layer 12 is cross linked, in the vicinity of the interface of the alignment property providing layer 12 and the refractive index anisotropic layer 13, with the molecules in the refractive index anisotropic layer 13 adjacent to the alignment property providing layer 12, the adhesion between the alignment property providing layer 12 and the refractive index anisotropic layer 13 can be improved as well.

Here, the adding amount of the above-described monomer or oligomer can be adjusted optionally in a range not to deteriorate the optical characteristics of the optical element 10, as long as the adhesion be ween the alignment property providing layer 12 and the refractive index anisotropic layer 13 can sufficiently be improved. However, in general, it is preferably 0.01% by weight or more and 3% by weight or less with respect to the solid component (polymer) weight. When it is less than 0.01% by weight, the effect of improving the adhesion between the alignment property providing layer 12 and the refractive index arisotropic layer 13 cannot be exhibited sufficiently. On the other hand, when it is more than 3% by weight, even though the effect of improving the adhesion between the alignment property providing layer 12 and the refractive index anisotropic layer 13 is sufficient, the alignment property may not be provided sufficiently to the refractive index anisotropic layer 13. That is, as it will be described later, the refractive index anisotropic layer 13 is obtained by going through the processes of aligning the liquid crystal molecules and fixing of the alignment state thereof. Since the above-described monomer or oligomer is an alignment inhibiting substance at the time of aligning the liquid crystal molecules, rising of the haze, unevenness generation or the like due to the alignment failure may be brought about. Thus, the optical function may be deteriorated.

Moreover, it is preferable that the above-described monomer or oligomer is a polymerizable liquid crystal material. In particular, it is preferable that such monomer or oligomer made from the polymerizable liquid crystal material is a material of the same kind as the polymerizable liquid crystal material in the refractive index anisotropic layer 13. Thereby, the monomer or oligomer in the alignment property providing layer 12 can be cross linked with the molecules in the refractive index anisotropic layer 13 adjacent to the alignment property providing layer 12 more easily. Thus, the adhesion between the alignment property providing layer 12 and the refractive index anisotropic layer 13 can further be improved.

Furthermore, in the case the transparent base material 11 is a long film, and is rolled up at the time the alignment property providing layer 12 is laminated on the transparent base material 11, it is preferable that the kind and the adding amount of the monomer or oligomer are adjusted optionally such that the alignment property providing layer 12 can be close to a solid at an ordinary temperature. In this case, as the kind of the monomer or oligomer, it is preferable to use those of high molecular weight. Thereby, even in the case the transparent base material 11 is rolled up at the time the alignment property providing layer 12 is laminated thereon, the problem of blocking, generated by sticking of the alignment property providing layer 12 onto the rear surface of the transparent base material 11, dose not occur.

The refractive index anisotropic layer 13 is an optical functional layer for exhibiting the function as a retardation plate, a polarizing plate, a color filter for a display or the like. The refractive index anisotropic layer 13 comprises a liquid crystal layer formed by curing (polymerizing) a liquid crystalline composition including a polymerizable liquid crystal material. In the refractive index anisotropic layer 13, as shown in FIG. 2, the curing degree of the refractive index anisotropic layer 13 changes monotonously with a predetermined gradient in its thickness direction such that, within the refractive index anisotropic layer 13, the curing degree of the portion closer to the alignment property providing layer 12 is larger, compared with the curing degree of the portion farther from the alignment property providing layer 12. Here, the "surface" of FIG. 2 denotes an interface between the refractive index anisotropic layer 13 and the air. The "rear surface" of FIG. 2 denotes an interface between the refractive index anisotropic layer 13 and the alignment property providing layer 12. Moreover, it is preferable that the average curing degree of the refractive index anisotropic layer 13 is 90% or more. Here, the "monotonous change" denotes increase or decrease of the curing degree in its thickness direction with a certain tendency, and it is not limited to the linear change, but it also includes an optional change such as a quadratic curve and an exponential curve. Moreover, it is not limited to the monotonous change in a strict sense (monotonous increase or monotonous reduction), but it also includes a stepwise increase or decrease. Moreover, the "average curing degree" is the average value of the curing degree in its thickness direction as a whole of the refractive index anisotropic layer 13.

The thickness of the refractive index anisotropic layer 13 is determined by the desired optical characteristics.

Here, in addition to the below-described polymerizable liquid crystal materials, it is preferable that the liquid crystalline composition for forming the refractive index anisotropic layer 13 includes optional additives (such as a polymerization initiator, a plasticizing agent, a surfactant and a silane coupling agent) in a range not to influence the alignment of the liquid crystal material or the optical characteristics. The adding amount of the additive can be adjusted optionally according to the liquid crystal material and the like in the liquid crystalline composition. However, in general, it is preferably 0.001% by weight or more and 10% by weight or less with respect to the solid component (polymerizable liquid crystal material) weight. Moreover, although such a liquid crystalline composition can be coated as it is, on the alignment property providing layer 12, it may also be dissolved in an appropriate solvent such as an organic solvent, in order to match the viscosity to a coating device or to obtain a preferable alignment state.

On the other hand, as a polymerizable liquid crystal material included in such a liquid crystalline composition, a nematic liquid crystal compound having a nematic regularity can be used preferably. Specifically, the compounds disclosed in JP-A No. 7-258638, Japanese Patent Application National Publication (Laid-Open) No. 10-508882, and JP-A No. 2003-287623 can be used optionally. More specifically, it is preferable to use the compounds represented by the following chemical formulae (1) to (10).

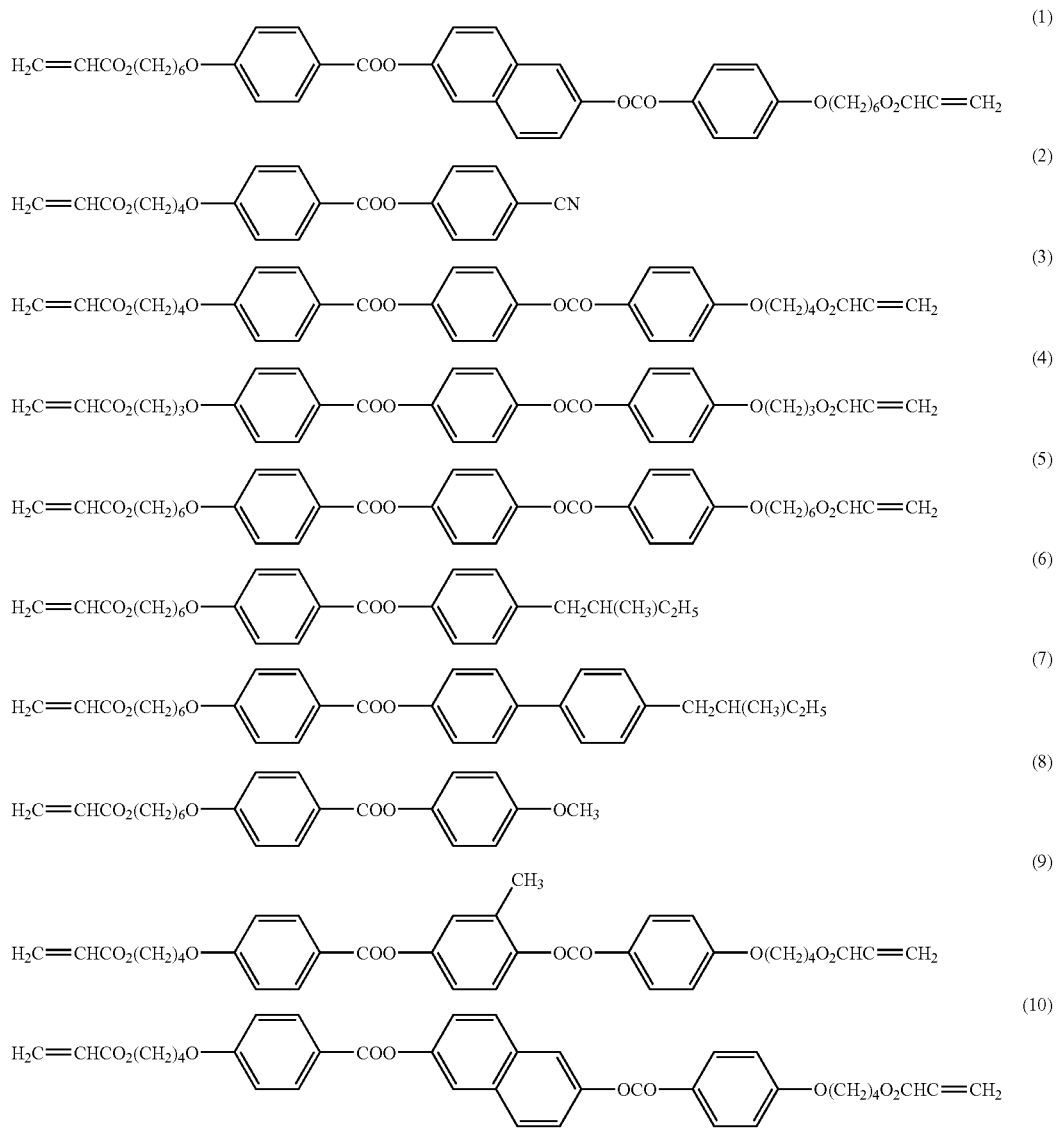

However, the nematic liquid crystal compound to be used in this embodiment is not limited to the above-mentioned ones, but optional ones can be used as long as it is a liquid crystal compound with a nematic liquid crystal property, having one or more functional groups (such as a ultraviolet ray curing polymerizable group) on the end. Moreover, among the above-described nematic liquid crystal compounds, a several kinds of the materials can be mixed and used optionally.

Figure 3:
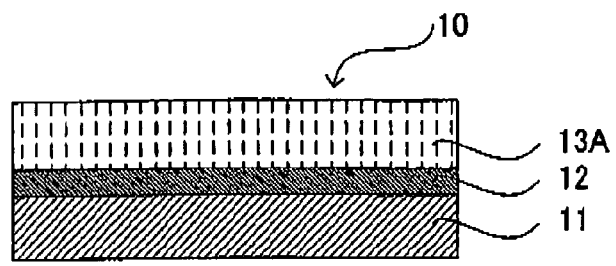
FIG. 3 is a cross-sectional view schematically showing a modified example of the optical element shown in FIGS. 1 and 2.

Here, the liquid crystalline composition including such a nematic liquid crystal composition is coated on the alignment property providing layer 12 by the below-described methods and is cured (polymerized) by irradiating a ultraviolet ray or the like. The accordingly formed finally obtained refractive index anisotropic layer 13 may comprise, as shown in FIG. 1, a liquid crystal layer with the nematic liquid crystal molecules fixed in a state that molecules are aligned in parallel with respect to the transparent base material 11 otherwise, as the refractive index anisotropic layer 13A shown in FIG. 3, the layer may comprise a liquid crystal layer with the nematic liquid crystal molecules fixed in a state that molecules are aligned vertically with respect to the transparent base material 11. The liquid crystal structure of the refractive index anisotropic layer 13 shown in FIG. 1 is a homogeneous structure (parallel alignment structure). With this structure, an optical functional layer referred to as an A plate can be obtained. On the other hand, the liquid crystal structure of the refractive index anisotropic layer 13A shown in FIG. 3 is a homeotropic structure (vertical alignment structure). With this structure, an optical functional layer referred to as a positive (+) C plate can be obtained.

On the other hand, as the polymerizable liquid crystal material included in the liquid crystalline composition, a mixture of the polymerizable nematic liquid crystal compound and a chiral agent may be used (see JP-A No. 2003-287623). The chiral agent is used for the purpose of inducing the helical structure in the nematic regularity exhititd by the nematic liquid crystal compound. As long as this purpose is achieved, optional kinds satisfying the following can be used: compatible with the nematic liquid crystal compound in a solution state or a molten state; and capable of inducing a desired helical structure without deteriorating the liquid crystal property of the nematic liquid crystal compound. Specifically, for example, it is preferable to use a low molecular compound having the axial asymmetry within the molecule, represented by the following general formulae (11), (12), or (13).
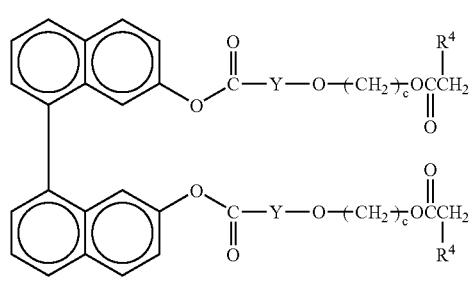
(11)
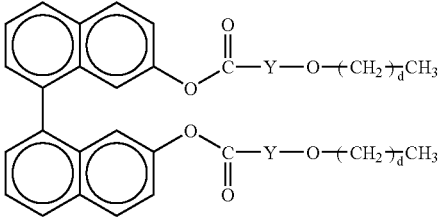
(12)
(13)
(e = an integer from 2 to 5)
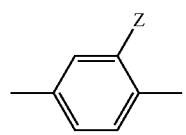
(i)
(ii)
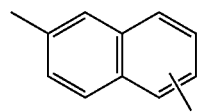
(iii)
(iv)
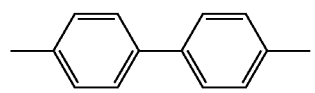
(v)
(vi)
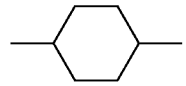
(vii)
(viii)
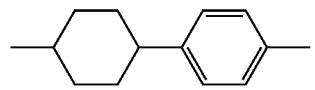
(ix)
(x)
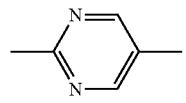
(xi)
(xii)
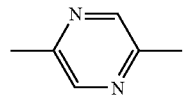
(xiii)
(xiv)
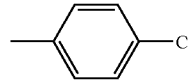
(xv)
(xvi)

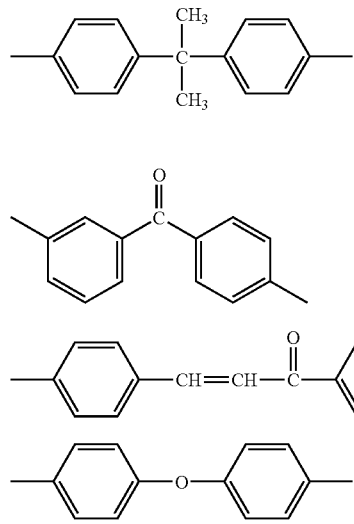

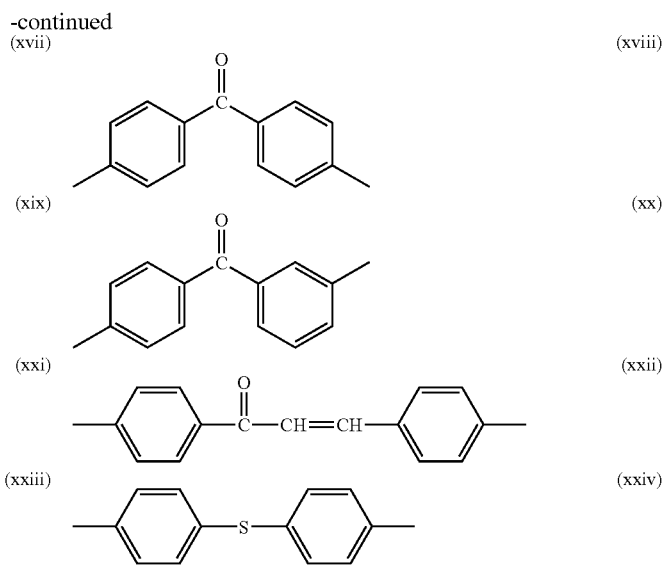

In the above-mentioned general formulae (11) or (12), R4 denotes a hydrogen or a methyl group. Y is an optional one of the above-mentioned formulae (i) to (xxiv). Among them, it is preferably any one of the formulae (i), (ii), (iii), (v) and (vii). Moreover, c and d, representing the chain length of an alkylene group can each independently be an optional integer in a range of 2 to 12. They are preferably in a range of 4 to 10, and further preferably in a range of 6 to 9. When the value c or d is 0 or 1, the compounds of the above-mentioned general formula (11) or (12) lack in stability, easily hydrolyzed, and have a high crystal property. On the other hand, when the value c or d is 13 or more, the compounds have low melting point (Tm). In these compounds, the compatibility with respect to the polymerizable liquid crystal material showing the nematic regularity may be lowered. Therefore, depending on the concentration, the phase separation or the like may occur. There is no need that such chiral agent has the polymerization property, in particular. However, in the case the chiral agent has the polymerization property, since it is polymerized with the polymerizable liquid crystal material showing the nematic regularity so that the cholesteric regularity can be fixed stably, it is extremely preferable in terms of the thermal stability or the like. In particular, it is preferable that the both ends of the molecule have a polymerizable functional group, in terms of obtaining the refractive index anisotropic layer 13 having a preferable heat resistance.

Figure 4:
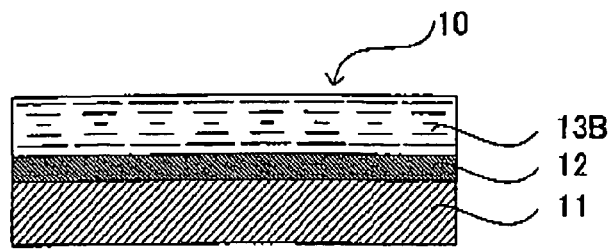
FIG. 4 is a cross-sectional view schematically showing another modified example of the optical element shown in FIGS. 1 and 2.

In this case, as the refractive index anisotropic layer 13B shown in FIG. 4, the finally obtained refractive index anisotropic layer, which is formed on the alignment property providing layer 12, comprises a liquid crystal layer with the nematic liquid crystal molecules fixed in a state of a helical structure of the planar alignment (state having the cholesteric regularity) with respect to the transparent base material 11. In this case, the liquid crystal structure of the refractive index anisotropic layer 13B is the cholesteric structure. With this structure, an optical functional layer referred to as a negative (−) C plate can be obtained.

Figure 5:
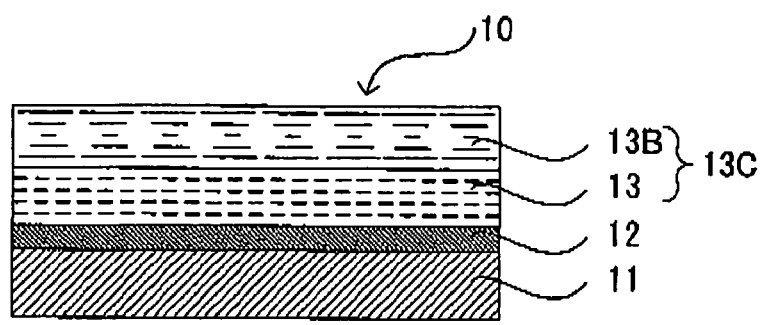
FIG. 5 is a cross-sectional view schematically showing still another modified example of the optical element shown in FIGS. 1 and 2.

As the refractive index anisotropic layer 13C shown in FIG. 5, in the finally obtained refractive index anisotropic layer formed on the alignment property providing layer 12, the refractive index anisotropic layer 13 shown in FIG. 1 and the refractive index anisotropic layer 13B shown in FIG. 4 may be laminated on each other. Besides the above, among the liquid crystal layers 13, 13A, 13B shown in FIGS. 1, 3 and 4, two or more layers, of the same kind or different kinds, maybe laminated on each other.

Figure 6:
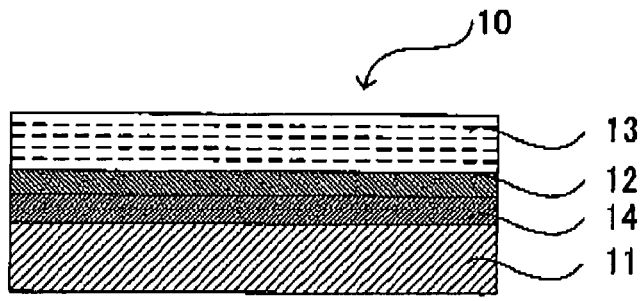
FIG. 6 is a cross-sectional view schematically showing still another modified example of the optical element shown in FIGS. 1 and 2.

Moreover, as shown in FIG. 6, a barrier layer (intermediate layer) 14 for blocking the elution of a plasticizing agent or the like included in the transparent base material 11 may be provided in between the transparent base material 11 and the alignment property providing layer 12. As the material for the barrier layer 14, for example, an ultraviolet ray curing type acrylic urethane based resin, an ultraviolet ray curing type polyester acrylate based resin, an ultraviolet ray curing type epoxy acrylate based resin, an ultraviolet ray curing type polyol acrylate based resin, an ultraviolet ray curing type epoxy resin or the like can be presented. Generally, the ultraviolet ray curing type acrylic urethane based resin can be obtained easily by reacting a polyester polyol with an isocyanate monomer or prepolymer, and further reacting the obtained product with an acrylate based monomer having a hydroxyl group such as a 2-hydroxy ethyl acrylate, a 2-hydroxy ethyl methacrylate (hereinafter, with the premise that the acrylate includes the methacrylate, only the acrylate will be shown), and a 2-hdyroxy propyl acrylate. Generally, the ultraviolet ray curing type polyester acrylate based resin car be obtained easily by reacting a polyester polyol with a 2-hydroxy ethyl acrylate or a 2-hydroxy acrylate based monomer. As the specific examples of the ultraviolet ray curing type epoxy acrylate based resin, one prepared by making an epoxy acrylate into an oligomer, and adding a reactive diluting agent and a photo reaction initiator thereto for reaction can be presented. As the photo reaction initiator, one kind or two or more kinds of a benzoin derivative, an oxime ketone derivative, a benzophenone derivative, a thioxantone derivative or the like can be selected and used. Moreover, as the specific examples of the ultraviolet ray curing type polyol acrylate based resin, a trimethylol propane triacrylate, a ditrimethylol propane tetraacrylate, a pentaerythritol triacrylate, a pentaerythritol tetraacrylate, a dipentaerythritol hexaacrylate, an alkyl modified dipentaerythritol pentaacrylate or the like can be presented. These resins are generally used together with a known photo sensitizer.

Here, in consideration to the improvement of the adhesion between the barrier layer 14 and the alignment property providing layer 12, as mentioned above, it is preferable to add a monomer or an oligomer having one or more functional groups to the alignment film composition for forming the alignment property providing layer 12. Also, as the material for the barrier layer 14, it is preferable to add the monomer or the oligomer of the same kind as the monomer or the oligomer to be added to the alignment film composition. Thereby, as in the above-mentioned case (in the case of improving the adhesion between the alignment property providing layer 12 and the refractive index anisotropic layer 13), the adhesion between the barrier layer 14 and the alignment property providing layer 12 can be improved due to the cross linking of the monomer or the oligomer in the barrier layer 14 with the molecules in the alignment property providing layer 12 adjacent to the barrier layer 14.

Instead of the barrier layer 14, an intermediate layer such as an adhesive layer, for improving the adhesion between the transparent base material 11 and the alignment property providing layer 12, may be provided.

Next, referring to FIG. 7, the method for manufacturing the optical element 10 having such a configuration will be explained.

Figure 7A:
FIG. 7 is a process diagram for explaining a method for manufacturing an optical element according to an embodiment of the present invention.
Figure 7B:
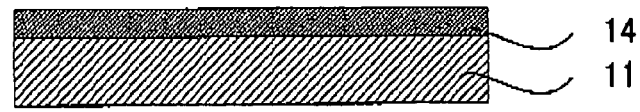

First, as the transparent base material 11, for example, a transparent resin film is prepared (FIG. 7A). Then, the barrier layer 14 is formed on one side surface of the transparent base material 11 (FIG. 7B).

In the case, for example, an ultraviolet ray curing resin is used as the material for the barrier layer 14 to be formed on the transparent base material 11, after coating the barrier layer composition, it is cured (polymerized) by irradiating an ultraviolet ray or the like.

Figure 7C:

Next, by coating a alignment film composition, including a polymer and a coupling agent, on the barrier layer 14 formed on the transparent base material 11, a coated film 12' of the alignment film composition is formed (FIG. 7C). At the time, the alignment film composition is coated in a form of a solution of the alignment film composition obtained by dissolving in an organic solvent. As the coating method, for example, spin coating, bar coating, extrusion coating, direct gravure coating, reverse gravure coating, die coating or the like can be used, but it is not limited thereto.

Figure 7D:
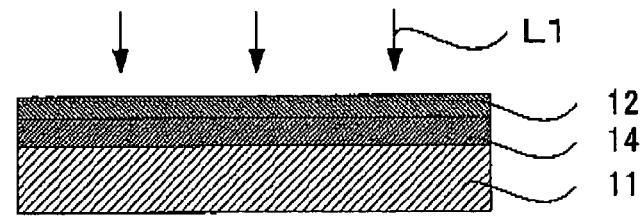

Thereafter, a heated-air drying process is applied to the coated film 12' of the alignment film composition, accordingly formed on the barrier layer 14, by applying the heat H, and then, an ultraviolet ray L1 having an optional polarization state is irradiated thereto. Thereby, the alignment limiting force is exhibited on the surface of the coated film 12' of the alignment film composition so that an alignment property providing layer 12 as the alignment film is formed (FIG. 7D).

Figure 7E:
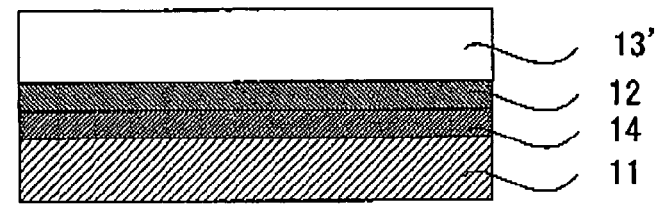

Next, a coated film 13' of the liquid crystalline composition is formed by coating a liquid crystalline composition, including a polymerizable liquid crystal material, on the alignment property providing layer 12 accordingly formed on the barrier layer 14 (FIG. 7E). At the time, the liquid crystalline composition is coated in a form of a solution of the liquid crystalline composition obtained by dissolving in an organic solvent. As the coating method, for example, spin coating, bar coating, extrusion coating, direct gravure coating, reverse gravure coating, die coating or the like can be used, but it is not limited thereto.

Figure 7F:
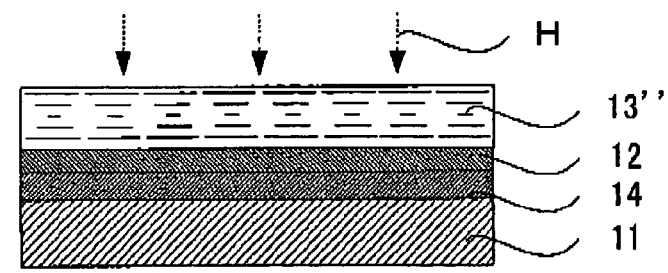

Thereafter, by applying a heated-air drying process to the coated film 13' of the Liquid crystalline composition accordingly formed on the alignment property providing layer 12, the alignment direction of the liquid crystal molecules in the coated film 13' of the liquid crystalline composition is limited by the alignment limiting force exhibited on the surface of the alignment property providing layer 12. Thus, a coated film 13" of the liquid crystalline composition, with the alignment property provided, is formed (FIG. 7F).

Figure 7G:
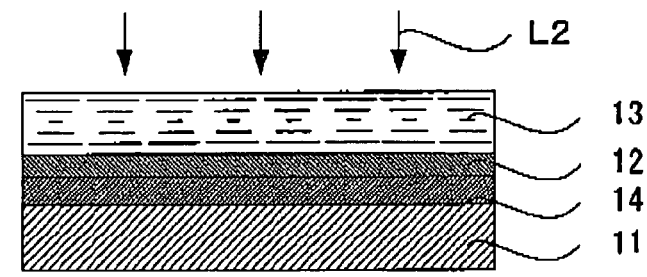

Then, by irradiating an ultraviolet ray (radioactive ray) L2, as the energy line, to the coated film 13" of the liquid crystalline composition accordingly provided with the alignment property for curing (polymerizing) the coated film 13" of the liquid crystalline composition, the alignment state of the liquid crystal molecules is fixed. At the time, the ultraviolet ray L2 is irradiated to the coated film 13" of the liquid crystalline composition in a state that, among the coated film 13" of the liquid crystalline composition, only the side not adjacent to the alignment property providing layer 12 is exposed to an air atmosphere. Thereby, the coated film 13" of the liquid crystalline composition is cured while delaying a curing rate of the coated film 13" of the liquid crystalline composition near a surface on the side not adjacent to the alignment property providing layer 12, compared with the curing rate near a surface on the side adjacent to the alignment property providing layer 12. That is, when a surface of the coated film 13" of the liquid crystalline composition is irradiated with the ultraviolet ray L2 for curing in a state being exposed to an air atmosphere, the curing of the radical polymerization type compound or the like including a (meth)acryloyl group is inhibited by the oxygen, on the air interface side surface of the coated film 13" of the liquid crystalline composition. Thus, the vicinity of the air interface side surface of the coated film 13" of the liquid crystalline composition is made more difficult to be cured. Therefore, within the coated film 13" of the liquid crystalline composition, the curing progresses gradually and slowly from the portion on the alignment property providing layer 12 side to the portion on the air interface side so that the curing gradient will be generated such that the uncured component increases from the portion on the alignment property providing layer 12 side to the portion on the air interface side. Thereby, the refractive index anisotropic layer 13 comprising a liquid crystal layer, whose curing degree changes monotonously with a predetermined gradient in its thickness direction, is formed on the alignment property providing layer 12 (FIG. 7G). The curing degree of the refractive index anisotropic layer 13 accordingly formed is preferably about 99% near the alignment property providing layer 12 side, and about 85% near the air interface side. The average curing degree of the finally obtained refractive index anisotropic layer 13 is preferably 90% or more. In the process of generating the curing gradient as mentioned above, after forming the refractive index anisotropic layer 13, an ultraviolet ray may be irradiated again for sufficient curing.

The curing slate of the refractive index anisotropic layer 13 can be found out by observing the residual amount of the reactive groups. Moreover, in order to observe the curing degree distribution within the layer of the refractive index anisotropic layer 13, a cross-sectional surface of the layer should be produced. Therefore, in a specific measuring method, first, the refractive index anisotropic layer 13 is cut by the oblique cutting method. If the refractive index anisotropic layer 13 is cut obliquely, since the cross-sectional surface obtained thereby has the apparent thickness larger than the ordinary cross-sectional surface, the spatial resolution can be made higher at the time of observing the residual amount of the reactive groups thereafter. Next, after accordingly obtaining the cross-sectional surface of the refractive index anisotropic layer 13, the residual amount of the reactive groups is observed. As representative methods for observing the residual amount of the reactive groups, she following methods can be presented: a method in which the molecular vibration deriving from the reactive groups is observed by the infrared ray absorption; and a method in which the mass attributing to the reactive group structure is measured. More specifically, (1) a method in which the intensity distribution of the stretching vibration of the double bond (C=C) of the carbons attributing to the reactive groups is measured by using the reflection measuring method of a microscope infrared spectrophotometer, (2) a method in which the mass number deriving from the reactive groups is mapped by using a rime of Flight Secondary Ion Mass Spectrometry (TOF-SIMS), (3) a method in which the signal intensity deriving from the reactive groups of all the carbons is measured by using an X ray photoelectron spectroscopy device, or the like can be presented. It is not limited to these measuring methods using a structure analysis technique, but the curing state of the refractive index anisotropic layer 13 can be found out also by methods of measuring the surface hardness of the cross-sectional surface of the refractive index anisotropic layer 13 using a minute curing meter or a nano indenter.

The curing degree is described by % in the present invention. The connection between the measured values (signal intensity) obtained from the above measurement methods: (1), (2) and (3), and the curing degree % is acquired by the following criterion. That is, since the refractive index anisotropic layer is formed by irradiating an ultraviolet ray to the coated film of the liquid crystalline composition which is formed by applying the liquid crystalline composition comprising the polymerizable liquid crystal material, each measured values (signal intensity) regarding the coated film, before the ultraviolet ray irradiation, obtained by the above (1), (2) and (3) is referred to as 0% in curing degree, while the signal intensity 0 obtained in the above (1), (2) and (3) is regarded as 100% in curing degree.

Moreover, the atmosphere, to which the side not adjacent to the alignment property providing layer 12 of the coated film 13" of the liquid crystalline composition is exposed, is not limited to the air atmosphere. Depending on the kind of the polymerizable liquid crystal compound included in the liquid crystalline composition, it can be exposed to an atmosphere including water. That is, in a cation polymerization compound or the like including an epoxy group, curing inhibition is brought about by water. Therefore, in the case of a liquid crystalline composition including such a liquid crystal compound, as in the above-mentioned case of the air atmosphere, the curing gradient, such that the uncured component is increased from the portion on the alignment property providing layer 12 side toward the portion on the atmosphere interface, can be generated.

Furthermore, it is preferable that the ultraviolet ray L2 to be irradiated to the coated film 13" of the liquid crystalline composition is irradiated only for a short time, with a high illuminance. For example, it is preferable to irradiate the coated film 13" with a 100 mW illuminance for only 2 seconds. Moreover, it is preferable that the ultraviolet ray L2 is a light including a wavelength in a range of 100 nm to 450 nm, and more preferably a light including a wavelength in a range of 250 to 400 nm. The light of a wavelength in this range can easily be obtained by a common light source, and by utilizing a general commercially available polymerization initiator, the chemical reaction such as the ultraviolet ray curing can be obtained more easily and efficiently.

The ultraviolet ray L2 is used as the radioactive ray to be irradiated to the coated film 13" of the liquid crystalline composition for forming the refractive index anisotropic layer 13. However, as such a radioactive ray, optional ones can be used as long as it can cure the above-described polymerizable liquid crystal material. Other than the ultraviolet ray, an electron beam, a visible light, an infrared ray (heat ray) or the like can be used optionally according to the conditions. However, from the viewpoint of the process easiness or the like, the ultraviolet ray is preferable.

In this embodiment, the alignment property providing layer 11, for providing the alignment property to the refractive index anisotropic layer 13, comprises an alignment film made from a alignment film composition capable of exhibiting the alignment limiting force by the photo-alignment method. Also, the refractive index anisotropic layer 13 comprises a liquid crystal layer formed by curing a liquid crystalline composition including a polymerizable liquid crystal material, and the curing degree of the refractive index anisotropic layer 13 changes monotonously with a predetermined gradient in its thickness direction such that, within the refractive index anisotropic layer 13, the curing degree of the portion closer to the alignment property providing layer 12 is larger, compared with the curing degree of the portion farther from the alignment property providing layer 12. Therefore, the adhesion between the alignment property providing layer 12 and the refractive index anisotropic layer 13 is excellent, and the durability of each layer is excellent. Thus, the problem of peeling off of the refractive index anisotropic layer 13 can be solved effectively.

In particular, in this embodiment, for the coated film 13" of the liquid crystalline composition, provided with the alignment property, formed on the alignment property providing layer 12 of the transparent base material 11, the ultraviolet ray L2 is irradiated to the coated film 13" of the liquid crystalline composition in a state that, among the coated film 13" of the liquid crystalline composition, only the side not adjacent to the alignment property providing layer 12 is exposed to an air atmosphere. And the coated film 13" of the liquid crystalline composition is cured while delaying the curing rate of the coated film 13" of the liquid crystalline composition near the surface on the side not adjacent to the alignment property providing layer 12, compared with the curing rate near the surface on the side adjacent to the alignment property providing layer 12. Thereby, within the coated film 13" of the liquid crystalline composition, the curing progresses gradually and slowly from the portion on the alignment property providing layer 12 side toward the portion on the air interface side, so as to generate the curing gradient such that the uncured component increases from the portion on the alignment property providing layer 12 side toward the portion of the air interface. Therefore, in the process of forming the refractive index anisotropic layer 13, the polymerizable liquid crystal material in the coated film 13" of the liquid crystalline composition is cured in a state that the curing shrinkage is restrained as much as possible. Thus, the adhesion of the coated film 13" of the liquid crystalline composition with respect to the alignment property providing layer 12 is maintained, as well as the internal stress generated within the coated film 13" of the liquid crystalline composition is alleviated. Thereby, in the finally manufactured optical element 10 the adhesion between the alignment property providing layer 12 and the refractive index anisotropic layer 13 is excellent, and the durability of each layer is excellent. Therefore, the problem of peeling off of the refractive index anisotropic layer 13 can be solved effectively.

Moreover, in this embodiment, by making the average curing degree of the refractive index anisotropic layer 13 of the finally manufactured optical element 10 is 90% or more, the adhesion with respect to the alignment property providing layer 12 can further be improved. Moreover, even in the case the optical element 10 is rolled up, the problem of blocking, generated by the refractive index anisotropic layer 13 sticking onto the rear surface of the transparent base material 11, is not generated. Therefore, the problem of peeling off of the refractive index anisotropic layer 13, the rising of the haze and unevenness generation or the lice, generation deriving from the alignment failure, can be solved more effectively.

EXAMPLES

Next, specific examples of the above-mentioned embodiments will be described.

Example 1

First, by adding a cyclohexanone (98 parts by weight) to an alignment film composition, including a polymer having a cinnamoyl group (2.0 parts by weight), and dissolving, a solution of an alignment film composition was obtained. Then, after coating this solution onto a triacetyl cellulose (TAC) film (thickness 80 μm), as the transparent base material, by a wire bar coater, it was dried for 2 minutes with hot air of 80° C. Thus, a 0.1 μm thickness coated film was obtained. By irradiating a polarized ultraviolet ray to the coated film by 10 mJ/cm2, an alignment film with the alignment limiting force exhibited on the surface was formed.

Next, a solution of a liquid crystalline composition was obtained by: dissolving a liquid crystalline composition, including a polymerizable nematic liquid crystal compound represented by the above-mentioned chemical formula (1), into a toluene solution by a 20% by mass ratio; and furthermore, adding a polymerization initiator (IRGACURE 907 (product name), manufactured by Chiba Speciality Chemicals). Then, by coating this solution onto the alignment film, produced in the above-mentioned process, by a wire bar coater and drying, a 1 μm thickness coated film was obtained. Next, by heating the coated film at 85° C. for 2 minutes, the liquid crystal molecules in the coated film were aligned by the alignment limiting force exhibited on the surface of the alignment film. Thereafter, a 300 mJ ultraviolet ray was irradiated, under the air atmosphere, utilizing a high pressure mercury lamp for curing the coated film. Thus, the alignment state of the liquid crystal molecules was fixed. Thereby, a nematic liquid crystal layer was formed on the alignment film, so as to finally manufacture an optical element in this example.

Example 2

First, according to the same method as in the above-mentioned example 1, an alignment film was formed on a triacetyl cellulose (TAC) film as the transparent base material.

Next, a solution of a liquid crystalline composition was obtained by: dissolving a liquid crystalline composition, including a polymerizable nematic liquid crystal compound represented by the above-mentioned chemical formula (1), into a toluene solution by a 20% by mass ratio; and furthermore, adding a polymerization initiator (IRGACURE 907 (product name), manufactured by Chiba Speciality Chemicals). Then, by coating this solution onto the alignment film, produced in the above-mentioned process, by a wire bar coater and drying, a 1 μm thickness coated film was obtained. Next, by heating the coated film at 85° C. for 2 minutes, the liquid crystal molecules in the coated film were aligned by the alignment limiting force exhibited on the surface of the alignment film. Thereafter, a 100 mJ ultraviolet ray was irradiated, under the nitrogen atmosphere, utilizing a high pressure mercury lamp for curing the coated film. Thus, the alignment state of the liquid crystal molecules was fixed. Thereby, a nematic liquid crystal layer was formed on the alignment film, so as to finally manufacture an optical element in this example 2.

Comparative Example

First, according to the same method as in the above-mentioned example 1, an alignment film was formed on a triacetyl cellulose (TAC) film as the transparent base material Next, a solution of a liquid crystalline composition was obtained by: dissolving a liquid crystalline composition, including a polymerizable nematic liquid crystal compound represented by the above-mentioned chemical formula (1), into a toluene solution by a 20% by mass ratio; and furthermore, adding a polymerization initiator (IRGACURE 907 (product name), manufactured by Chiba Speciality Chemicals). Then, by coating this solution onto the alignment film, produced in the above-mentioned process, by a wire bar coater and drying, a 1 μm thickness coated film was obtained. Next, by heating the coated film at 85° C. for 2 minutes, the liquid crystal molecules in the coated film were aligned by the alignment limiting force exhibited on the surface of the alignment film. Thereafter, a 100 mJ ultraviolet ray was irradiated under the air atmosphere, utilizing a high pressure mercury lamp for curing the coated film. Thus, the alignment state of the liquid crystal molecules was fixed. Thereby, a nematic liquid crystal layer was formed on the alignment film, so as to finally manufacture an optical element in this comparative example.

(Evaluation Result)

The curing degree of the nematic liquid crystal layer of each optical element of the example 1, the example 2 and the comparative example was measured. The curing degree was obtained by cutting the nematic liquid crystal layer with the oblique cutting method and subsequently measuring the obtained cross-sectional surface of the layer by the following process: the intensity distribution of the stretching vibration of the double bond (C=C) of the carbons attributing to the reactive groups is measured by using the reflection measuring method of a microscope infrared spectrophotometer. The results are shown in the table 1 below.

As shown in the table 1, the average curing degree of the optical element obtained in the example 1 was 98% and a curing gradient was generated. The optical element obtained in the example 2 generated a curing gradient, but the optical element showed a lower curing degree of 85%, when compared to the example 1.

On the other hand, the optical element of the comparative example 1 showed a curing degree of 85%, but generated no curing gradient.

Moreover, the results of visibly evaluating the alignment property of the liquid crystal molecules for each optical element of the example 1, the example 2 and the comparative example are shown in the following table 1. As it is apparent from the following table 1, the alignment state of the liquid crystal molecules was homogeneous in the optical elements of the example 1and the comparative example. Moreover, when the optical element of the comparative example was rolled up and left, the nematic liquid crystal layer was stuck onto the rear surface of the TAO film so as to generate blocking, and furthermore, the alignment state of the liquid crystal molecules was also disturbed.

Furthermore, for each optical element of the example 1, example 2 and the comparative example, as a test for evaluating the adhesion, a lattice pattern tape peeling test was carried out based on the JIS 5400. Specifically, using a Sellotape (registered mark) (CT24, manufactured by NICHIBAN CO., LTD.), after sticking the same to the film, with the ball of a finger, it was peeled off. The judgment was made based on the number of the squares, those were not peeled off, out of 100 squares. The case with the nematic liquid crystal layer was not peeled off at all is 100/100, and the case completely peeled off is 0/100. The results are shown in the following table 1. As it is apparent from the following table 1, the optical element of the comparative example did not have a preferable adhesion.

TABLE 1

|  | Liquid crystal alignment property | Adhesion | Refractive index anisotropic layer curing degree (%) | | |
| --- | --- | --- | --- | --- | --- |
|  |  |  | Air side | Alignment property providing layer side | Average curing degree |
| Example 1 | Homogeneous alignment | ○ (100/100) | 95 | 99 | 98 |
| Example 2 | Inhomogeneous alignment | Δ (40/100) | 84 | 86 | 85 |
| Comparative example | Homogeneous alignment | X (0/100) | 98 | 98 | 98 |

What is claimed is:

1. An optical element comprising:
    a transparent base material;
    an alignment property providing layer laminated on the transparent base material; and
    a refractive index anisotropic layer, laminated on the alignment property providing layer, with an alignment property provided by an alignment limiting force of the alignment property providing layer,
    wherein the alignment property providing layer comprises an alignment film made from an alignment film composition capable of exhibiting the alignment limiting force by an photo-alignment method, and
    the refractive index anisotropic layer comprises a liquid crystal layer formed by curing a liquid crystalline composition including a polymerizable liquid crystal material, and a curing degree of the refractive index anisotropic layer changes monotonously with a predetermined gradient in its thickness direction such that, within the refractive index anisotropic layer, the curing degree of a portion closer to the alignment property providing layer is larger, compared with the curing degree of a portion farther from the alignment property providing layer;
    wherein the alignment film composition for forming the alignment property providing layer includes a polymer having a cinnamoyl group;
    wherein the alignment film composition further includes a monomer or an oligomer having one or more functional groups, in addition to the polymer; and
    wherein the monomer or oligomer and the polymerizable liquid crystal material in the refractive index anisotropic layer are a material of a same kind.

2. The optical element according to claim 1, wherein the average curing degree of the refractive index anisotropic layer is 90% or higher.

3. The optical element according to claim 2, wherein the liquid crystalline composition for forming the refractive index anisotropic layer includes a nematic liquid crystal compound as the polymerizable liquid crystal material.

4. The optical element according to claim 1, wherein the liquid crystalline composition for forming the refractive index anisotropic layer includes a nematic liquid crystal compound as the polymerizable liquid crystal material.

* * * * *